United States Patent [19]
Kapoor et al.

[11] Patent Number: 5,682,534
[45] Date of Patent: Oct. 28, 1997

[54] TRANSPARENT LOCAL RPC OPTIMIZATION

[75] Inventors: Sandhya Kapoor; Kumar S. Varadan; Yi-Hsiu Wei, all of Austin, Tex.

[73] Assignee: International Business Machines Corporation, Austin, Tex.

[21] Appl. No.: 526,833

[22] Filed: Sep. 12, 1995

[51] Int. Cl.$^6$ ................................................ G06F 13/14
[52] U.S. Cl. ................ 395/684; 395/200.03; 364/242.5; 364/284; 364/DIG. 1
[58] Field of Search .................... 395/200.03, 650, 395/600, 200.01, 684; 364/242.5, 284, DIG. 1

[56] References Cited

U.S. PATENT DOCUMENTS

| | | | |
|---|---|---|---|
| 4,914,586 | 4/1990 | Swinehart et al. | 364/200 |
| 5,187,787 | 2/1993 | Skeen et al. | 395/600 |
| 5,218,699 | 6/1993 | Brandle et al. | 395/650 |
| 5,257,369 | 10/1993 | Skeen et al. | 395/650 |
| 5,265,020 | 11/1993 | Nakayama | 364/424.04 |
| 5,280,610 | 1/1994 | Travis, Jr. et al. | 395/600 |
| 5,297,285 | 3/1994 | Abrahamsson et al. | 395/700 |
| 5,307,490 | 4/1994 | Davidson et al. | 395/650 |
| 5,363,489 | 11/1994 | Snyder | 395/275 |
| 5,377,350 | 12/1994 | Skinner | 395/600 |
| 5,379,430 | 1/1995 | Nguyen | 395/700 |
| 5,386,568 | 1/1995 | Wold et al. | 395/700 |
| 5,404,519 | 4/1995 | Denio | 395/650 |
| 5,404,523 | 4/1995 | Dellafera et al. | 395/650 |
| 5,497,463 | 3/1996 | Stein et al. | 395/200.03 |

*Primary Examiner*—Alyssa H. Bowler
*Assistant Examiner*—John Harrity
*Attorney, Agent, or Firm*—Jeffrey S. LaBaw; David H. Judson

[57] ABSTRACT

A method for managing communication between a client process and a server process in a distributed computing environment, the client process residing on a host computer that is connected to a physical network having a transport layer and a network layer. The method begins when the client process makes a remote procedure call by detecting whether a server process identified by the remote procedure call is located on the host computer. If so, a binding handle vector is returned to the client process. The protocol sequence in the binding handle is mapped to a second protocol sequence that establishes an interprocess communication path between the client and server processes instead of a path through the transport and network layers of the physical network. The remote procedure call is then executed, preferably by using a send and receive messaging facility of the host computer operating system.

13 Claims, 2 Drawing Sheets

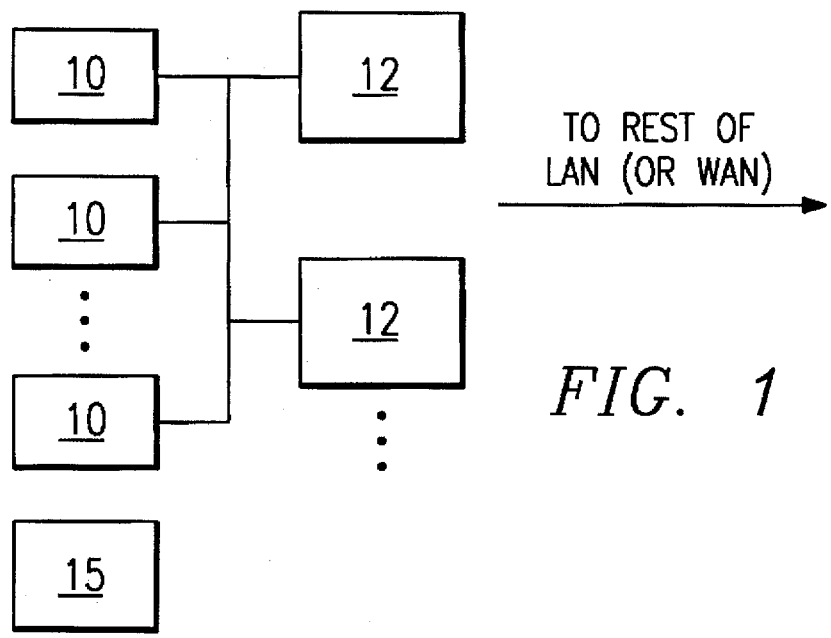
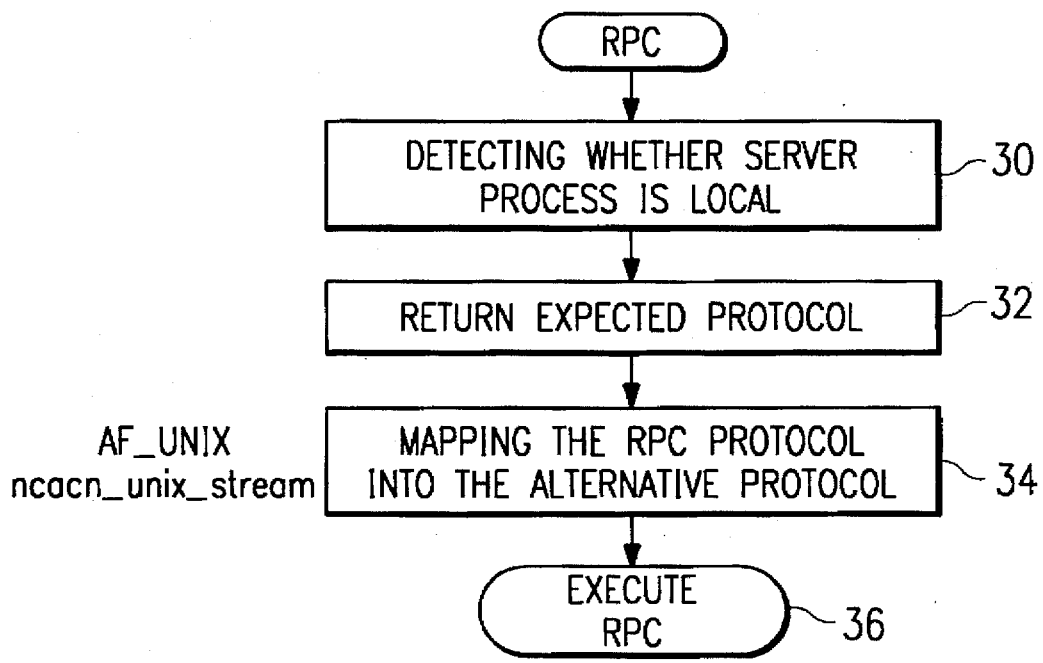

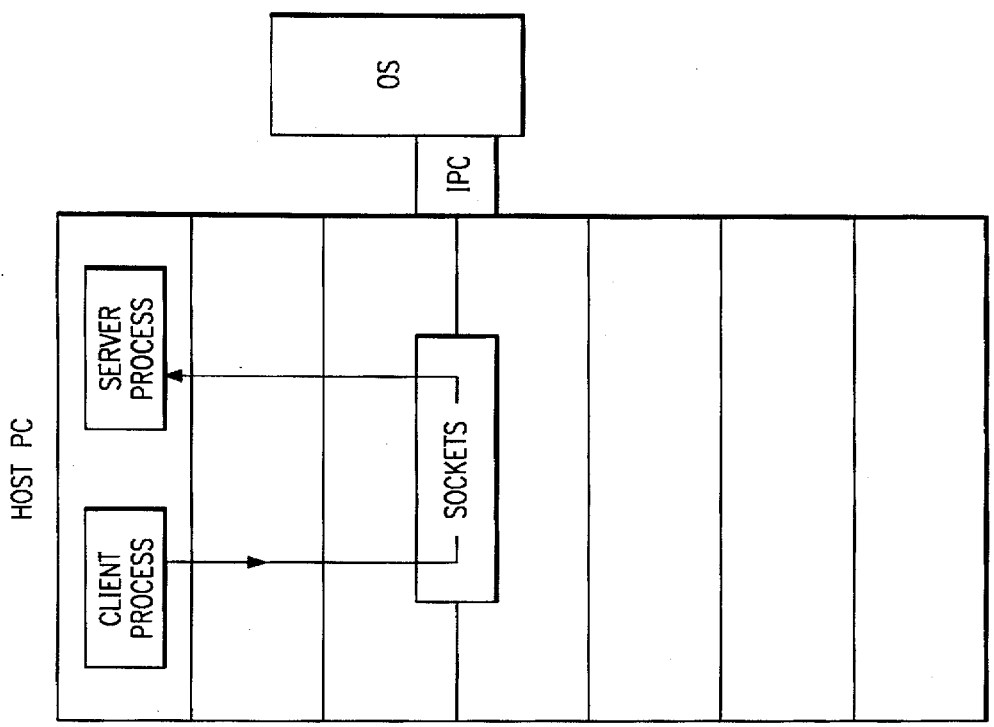
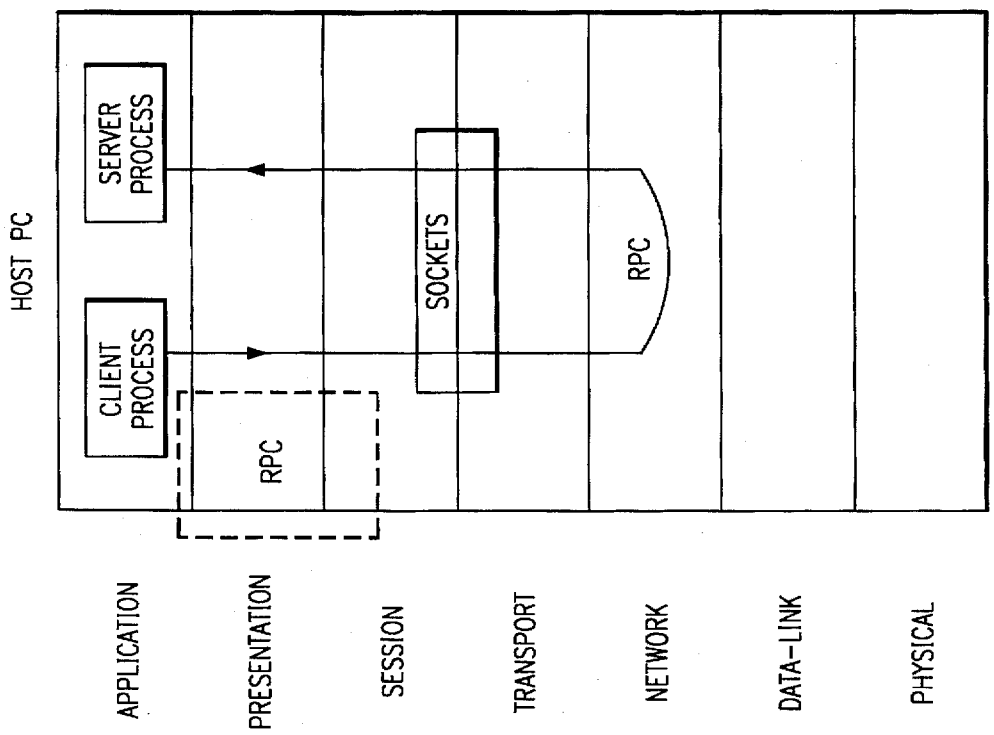

TRANSPARENT LOCAL RPC OPTIMIZATION

TECHNICAL FIELD

The present invention relates generally to network communication and more particularly to a method for efficiently managing remote procedure calls between client and server processes in a computer network when these processes are supported on the same host computer.

BACKGROUND OF THE INVENTION

It is known in the art to interconnect multiple computers into a local area network (LAN) to enable such computers to exchange information and share resources. A local area network provides a distributed computing environment in which users can access distributed resources and process applications on multiple computers. Network communications are carried out using so-called communication protocols. By convention, communication architectures in a local area network are typically characterized as conforming to a seven layer model in the following hierarchy: physical layer, logical link layer, network layer, transport layer, session layer, presentation layer and application layer. The physical layer comprises the actual physical devices and medium used to transmit information. The logical link layer frames data packets and controls physical layer data flow, insuring delivery of data regardless of the actual physical medium. The network layer addresses and routes data packets. It creates and maintains a route in the network between a source node and a destination node. The transport layer creates a transport pipeline between nodes and manages the network layer connections. The session layer typically provides remote procedure call (RPC) support, maintains the integrity of the connection between nodes and controls data exchange. The presentation layer encodes and decodes data and provides transparency between nodes. Finally, the application layer provides the interface to end-user processes and provides standardized services to applications.

The seven layer model has many variations depending on the particular network architecture. Thus, for example, in a network architecture based on the TCP/IP (Transmission Control Protocol/Internet Protocol) interface running IBM RISC System/6000® computer workstations under the AIX Operating System, there is another layer, called the socket layer, that sits between the session and transport layers. The socket layer creates so-called "sockets" which are logical constructs analogous to physical ports. In this architecture, the RPC mechanism is not just supported in the session layer, but also includes functionality of the session layer. A known RPC mechanism useful in distributed computing environments (DCE) includes software code provided by the Open Systems Foundation (OSF).

The OSF DCE RPC mechanism is used conventionally to manage communication between a "client" and a "server" in a distributed computing environment, with the client requesting a service from a server using a remote procedure call (RPC). A "client" refers to a network participant that is requesting a service accessible somewhere within the computing environment. A "server" provides the requested service to a client. With the OSF DCE RPC mechanism, each client process (namely, a process running on a client machine) has an associated socket created by the socket layer. Each server process likewise is associated with a socket. In response to an RPC, a call directory service returns a data structure, called a "binding handle," specifying the location of the server process as a network address and the port number where the server process is running. The binding handle is then used by the RPC mechanism to define a communication path between the client process and the server process. The path is defined using ip-based (i.e., network layer) protocol sequences of the Internet Network Address Family (AF_INET) to open the sockets. The path loops down from the client process through the transport and network layers, out on the network and then back up the layers associated with the host on which the server process is running.

The OSF DCE RPC mechanism as described above cannot distinguish whether client and server processes are running on the same host machine. In all cases, the mechanism returns a binding handle to the client process including an AF_INET protocol sequence that sets up a communication path through the transport (TCP or UDP) layer and the network (IP) layer. Communications through TCP use connection-oriented protocol sequences while those through UDP use connection-less protocol sequences. But in either case, when the client and server processes reside on the same host, an RPC generates a so-called loopback message because once the network (IP) layer receives the destination network address, it recognizes that the RPC is "local"; the path must therefore be looped back up through the transport layer to the server process on the applications layer. Because of this loopback requirement, RPC's between client and server processes on the same machine are not optimized from a performance standpoint as they use the transport and network layers unnecessarily.

BRIEF SUMMARY OF THE INVENTION

It is therefore a principal object of the invention for efficiently managing remote procedure calls (RPC's) between client and server processes running on the same host computer in a network.

It is another object of the invention to enable a network RPC mechanism to distinguish whether client and server processes are running on the same host machine and, if so, to bypass the network and transport layers using an alternate protocol sequence that exploits local interprocess communication (IPC) facilities.

It is a more specific object of the invention to recognize when client and server DCE processes exist on the same host to thereby use a local IPC mechanism, instead of a network layer (IP) or transport layer (TP) path, to implement a remote procedure call. Bypassing the IP or TP layers provides significant performance gains.

It is another object of the invention to use an IPC mechanism to effect a "local" RPC, which is an RPC made between two processes that are running on the same host machine. In one particular embodiment, the IPC mechanism is UNIX Domain sockets, and the invention uses a connection-oriented protocol sequence to open such sockets based on the UNIX Network Address Family (AF UNIX). With AF_UNIX, the operating system kernel handles the task of bridging communications between the two processes on the same host.

Another object of the invention is to automate the use of the local RPC mechanism when server and client processes are running on the same machine. When the server and client processes are on the same machine, the protocol sequence for local RPC is used without the application being aware of the local nature of the RPC.

Preferably, the local RPC feature is always enabled, and the "local" RPC is effected transparently to the client process. Thus, in response to detection of an RPC intended for a local server process, an expected protocol sequence is returned to the client process while an alternate protocol sequence is used to facilitate the RPC through the host computer IPC mechanism.

These and other objects of the invention are implemented in a method for managing communication between a client process and a server process in a distributed computing environment, the client process residing on a host computer that is connected to a physical network having a transport layer and a network layer. The method begins when a client process makes a remote procedure call (RPC) by detecting whether a server process identified by the remote procedure call is located on the same host computer. If so, a binding handle vector is returned to the client process including at least one binding handle having a protocol sequence that establishes an interprocess communication path between the client and server processes instead of a path through the transport and network layers of the physical network. The remote procedure call is then executed, preferably by using a send and receive messaging facility of the host computer operating system.

According to a preferred embodiment of the invention, the "local" RPC is effected transparently to the client process. Thus, in response to detection of an RPC intended for a local server process, an expected protocol sequence is returned to the client process while an alternate protocol sequence is used to facilitate the RPC. The alternate protocol sequence establishes the communication path through the same host computer IPC mechanism.

More generally, the inventive method responds to a local RPC by first returning to the client process a first data structure including a protocol sequence defining a communication path through use of the transport and network layers. The first data structure is then mapped into a second data structure, which includes a protocol sequence defining an interprocess communication path between the client process and the server process. The remote procedure call is then executed over the interprocess communication path defined by the protocol sequence in the second data structure. Thus, in the preferred embodiment, the protocol sequence of the first data structure is not used to effect the RPC.

In a specific implementation where the host computer supports a UNIX-based operating system, the method responds to the RPC by detecting if the server process identified by the RPC is located on the same host computer. If so, the method returns to the client process a binding handle having a protocol sequence normally associated with the remote procedure call. The protocol sequence associated with the remote procedure call is typically either a connection-oriented protocol "ncacn_ip_tcp" or a connection-less protocol "ncadg_ip_udp." The protocol sequence is then mapped into an alternate protocol sequence that establishes an interprocess communication path between the client process and the server process. Where the RPC identifies the connection-oriented protocol, this step maps "ncacn_ip_tcp" to the protocol sequence "ncacn_unix_stream." Where the RPC identifies the connection-less protocol, this step maps "ncadg_ip_udp" to "ncadg_unix_dgram." The client process thus "sees" the protocol sequence it expects but that sequence is not used to effect the RPC. Rather, the method executes the remote procedure call transparently to the client process, typically using a send and receive messaging facility of the UNIX-based operating system.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 illustrates a computer network in which the present invention is implemented;

FIG. 2A illustrates a conventional RPC using the network and transport layers of the physical network; and FIG. 2B illustrates the present invention wherein a local RPC is carried out using an IPC mechanism of the host computer.

FIG. 3 illustrates a preferred method for optimizing the procedure for providing local remote procedure calls.

DETAILED DESCRIPTION

As described above, the present invention is directed generally to managing communication between client and server processes in a local area network providing a distributing computing environment in which users can access distributed resources and process applications on multiple computers. A known distributed computing environment (DCE) is illustrated in FIG. 1 and includes clients 10 interconnected to servers 12 via a network 14. Each of the clients 10 and servers 12 is a computer. For example, each computer may be an IBM® RISC System/6000® (a reduced instruction set or so-called RISC-based workstation) running the AIX (Advanced Interactive Executive) operating system. The AIX operating system is compatible at the application interface level with AT&T's UNIX operating system, version 5.2. The various models of the RISC-based workstation computers are described in many publications of the IBM Corporation, for example, *RISC System/6000, 7073 and 7016 POWERstation and POWERserver Hardware Technical Reference*, Order No. SA23-2644-00. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986).

In one particular implementation, the invention runs on a plurality of IBM RISC System/6000 interconnected by IBM's System Network Architecture (SNA), and more specifically SNA LU 6.2 Advanced Program to Program Communication (APPC). SNA uses as its link level Ethernet, a local area network (LAN) developed by Xerox Corporation, or SDLC (Synchronous Data Link Control). A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers than the IBM RISC-based PC's interconnected by other networks than the Ethernet LAN or IBM's SNA. Thus, for example, the invention may be implemented in IBM's PS/2 line of computers running under the OS/2 operating system. For more information on the PS/2 line of computers and the OS/2 operating system, the reader is directed to *Technical Reference Manual Personal Systems/2 Model* 50, 60 *Systems IBM Corporation*, Part No. 68x2224 Order Number S68X-2224 and OS/2, 2.0 Technical Library, Programming Guide Volumes 1–3 Version 2.00, Order Nos. 10G6261, 10G6495 and 10G6494.

Returning now back to FIG. 1, each of the clients 10 and servers 12 may operate as a client or server, depending on whether it is requesting or supplying services. Typically, the client includes at least one process that requests a service from a server process using a remote procedure call (RPC). Numerous DCE applications, however, are written in such a manner that both "client" and "server" processes run on the same host computer. This is illustrated in FIG. 1 by the client/server 15. An RPC from a client process intended for a server process on the client/server 15 is said to be "local" or a "local RPC" for purposes of the following discussion.

In the OSF DCE RPC mechanism of the prior art, all RPC's, whether local or not, are carried out using network-based (e.g., "ip-based") protocol sequences: "ncacn_ip_tcp" or "ncadg_ip_udp," where "ncacn" refers to a connection-oriented OSF DCE RPC protocol and "ncadg" refers to a connection-less OSF DCE RPC protocol. When using these protocols, the Internet Address Family (AF_INET) communication domain is used, as evidenced by the "ip" nomenclature. The final component of each sequence refers to the socket type, thus for example "udp" refers to a datagram. In response to an RPC, a call to the cell directory service daemon (CDSD) returns a so-called "binding handle" specifying the location of the server process as a network address and the port number where the server process is running. The binding handle also identifies the server process required by the RPC. The binding handle is then used by the RPC mechanism to define a communication path between the client process and the server process. The path is defined using the ip-based (i.e. network layer) protocol sequences of AF_INET to open the sockets. The path loops down from the client process through the transport and network layers, out on the network and then back up the layers associated with the host on which the server process is running.

Thus, even if the client and server processes are on the same host machine, the transport (TCP or UDP) and network (IP) layers are used to send a loopback message. This is illustrated in FIG. 2A.

According to the present invention, instead of using the ip-based protocol sequences, an alternate protocol sequence is used to facilitate the local RPC in a manner which is transparent to the client process. Because of this transparency, the local RPC is sometimes said to be performed "under the covers" of the application. If the operating system is AIX or OS/2, an protocol sequence "ncacn_unix_stream" is used upon a local RPC identifying the connection-oriented ip-based protocol sequence (namely, "ncacn_ip_tcp"). The designation "ncacn" refers to a connection-oriented RPC protocol, "unix" identifies a UNIX Network Address Family (AF_UNIX) communication domain, and "stream" identifies a UNIX domain stream socket. For OS/2, and provided the local RPC feature is enabled, an RPC issued under the connection-less ip-based protocol sequence (namely "ncadg_ip_udp") causes the use of the protocol sequence "ncadg_unix_dgram," where "ncadg" refers to connection-less RPC protocol and "unix_dgram" identifies a UNIX domain datagram socket. Of course, the above-described operating systems are merely exemplary and the invention should not be construed to be limited to use therein. In either case, the client process is returned the protocol sequence that it expects to see, even though the actual RPC is carried out using a different, local mechanism. The actual protocol sequence used avoids the transport and network layers by using the Unix Network Address Family (AF UNIX) communication domain.

With AF_UNIX, the operating system kernel handles the tasks of bridging communications between two processes on the same host. Although AF_UNIX is the preferred technique for implementing the interprocess communication (IPC) between the client and server processes, other OS IPC mechanisms (such as shared memory or message queues) could be used as well. In any case, use of local IPC mechanisms is significantly faster than doing a loopback call through the transport and network layers, so a performance improvement is realized. The function of the present invention is illustrated in FIG. 2B.

Preferably, the ncacn_unix_stream protocol sequence is only for use by RPC's being made between DCE application processes that reside on the same host machine. The RPC runtime will not return an ncacn_unix_stream binding to a client application if the server is not on the same host. Because the ncacn_unix_stream protocol sequence is for use with DCE applications on the same host machine, these bindings do not contain a network address. Also, the endpoint for a ncacn_unix_stream binding handle is represented as a full pathname to a UNIX socket file. A unique socket file is used for each association established between a client and server process. By default, these socket files are opened in a directory /var/dce/rpc/socket with the file name prefixed by DCE_CN. Also, by default, the name for each socket file is an object UUID (or universal unique identifier), which insures the uniqueness of each filename. The UUID's are essentially long random numbers created by a UUID generator routine. When allowing the RPC runtime to assign an endpoint to an ncacn_unix_stream binding, the binding will be an object UUID, which is thus guaranteed to be unique. This means there is no chance that a socket file will be used again on two invocations of a DCE application.

In a UNIX-based operating system, the OS kernel requires the user to open a file before the kernel does any work for the user. The socket files created by the present invention are zero length files that serve as placeholders for the OS kernel. Each unique socket file occupies an i-node entry in the file system that it was created in. The OS kernel carries out the RPC by using the socket file as a placeholder in the file system and then controlling its own data structures to send and receive data between the client and server processes to effect the RPC. Thus, for example, the OS kernel may use "Mbuf" data structures for this purpose.

The following represent several examples of ncacn_unix_stream string bindings useful in the present invention:

ncacn_unix_stream:[ ]

ncacn_unix_stream:[/var/dce/rpc/socket/0063980e-357b-1e07-878b-10005a4f3bce]

The protocol sequence thus includes a return to the connection-oriented "ncacn" RPC protocol, the AF_UNIX communication domain (identified by the "unix" component) and "stream" type sockets. In the first example, the endpoint (i.e., the data inside the brackets [ ]) is empty. In the second example, the endpoint identifies the default socket directory "/var/dce/rpc/socket/_" and a UUID.

The endpoint thus does not have to be an object UUID in the /var/dce/rpc/socket directory. The "endpoint" attribute in an IDL (Interface Definition Language) specification file can be used to specify the pathname to a unique file. Or an application could take an ncacn__unix__stream string binding as a command line argument, and convert it to a binding handle using a rpc__binding__from__string binding( ) routine. Examples of user-specified socket file paths are:

ncacn__unix__stream:[/var/dce/rpc/socket/foo]
ncacn__unix__stream:[/tmp/6094]
ncacn__unix__stream:[/5423]

In the last case, it should be noted that because the endpoint is not represented by an absolute path, the ncacn__ unix stream:[/var/dce/rpc/socket/5423] is assumed and is used to create the socket file. The entry in the endpoint map will also have an absolute path. This will not cause any problems when using the two forms interchangeably, because the relative path will always be expanded out to an absolute path before it is ever used.

In the original implementation of the local RPC technique, the RPC runtime library recognizes when the client and server are on the same host and encourages the use of ncacn__unix__stream by having the function rpc__ns__binding__import__next( ) return such bindings before it returns bindings for other protocol sequences or by having the function rpc__ns__binding__lookup__next( ) return all of the ncacn__unix__stream bindings in the lower positions of a binding vector. For performance reasons, the ncacn__unix__stream binding handles returned from the rpc__ns__binding__<import/lookup>__next( ) routines in such embodiment will be fully bound. This is because the binding came from the RPC endpoint map, and had an endpoint in it. In this embodiment, the ncacn__unix__stream binding information is not exported to the CDS namespace database when the RPC API routine rpc__ns__binding__export( ) is called. This is because ncacn__unix__stream bindings are only usable when the client and server DCE applications are on the same host. Because the CDS namespace can be read by DCE applications on any machine in the DCE Cell, the ncacn__unix stream bindings in the CDS namespace database would not be of any use to a client that needed to communicate with a remote server.

Instead, the ncacn__unix__stream bindings are only registered in the RPC endpoint map database when a DCE server application calls the RPC API routine rpc__ep__register( ). This is because there is an RPC endpoint map daemon running on every host machine in a DCE cell, which makes it a more logical place to store host specific information. When a client queries the CDS namespace for a compatible server binding, the RPC runtime determines if the call is for a server on the local host machine. If so, in addition to returning all of the bindings from the CDS namespace, the RPC runtime will go to the RPC endpoint map to see if there is a compatible ncacn__unix stream binding. If there is, then this binding is given preference over bindings returned from the CDS namespace. If the client and server are on different hosts, then the endpoint map lookup is not done, since it would never produce a usable binding.

When a DCE server application exits under normal conditions, it will unregister its endpoints from the RPC endpoint map, among other things, before it exits. In the case of ip-based protocols, such as ncacn__ip__tcp and ncadg__ip__udp, the ports that the DCE application was listening on are cleaned up by the operating system, so no application action is required to free up the ports. The ncacn__unix stream endpoints are user space files, and these are not removed by the operating system when a DCE application exits.

When allowing the RPC runtime to assign an endpoint to an ncacn__unix__stream binding, as noted above the binding will be an Object UUID, which is guaranteed to be unique. This means there is no chance that a socket file will ever be used over again on two invocations of a DCE application. Therefore, the fact that a stale socket file is left over is not problematic in the short term. But over time, these socket files will accumulate. As discussed above, the socket files are zero length files, but each one occupies an inode entry in the file system in which it was created. It is therefore desirable to have some means of cleaning up these stale socket files. This is done by the RPC endpoint mapper (RPC daemon).

Note that only sockets in the /var/dce/rpc/socket directory get cleaned up automatically. If a DCE application creates its ncacn__unix stream endpoints using a directory other than this, it is the responsibility of the application or the application user to ensure that stale endpoints are cleaned up. This is done using the rpc.clean utility. The rpc.clean utility allows the user to specify a directory that should be checked for stale socket files. It searches the directory and removes any stale sockets files that are found. It performs the same cleanup that the RPC endpoint map does. As an additional safeguard against socket file accumulations, the rpc.clean utility is involved whenever the DCE management scripts dce.clean, rc.dce, or rmdce are run.

The above-described local RPC approach (using unix domain sockets) has been implemented and helps boost overall DCE system performance by up to about 40% as many DCE internal activities (i.e. those involving communication with the RPC daemon and security/namespace services) are performed using RPCs between processes running on the same machine. According to the present invention, this local RPC mechanism is further enhanced. As will be seen, in the preferred embodiment it is desired that all local RPC operations be optimized as a default operation. Explicit connection-oriented (CN) protocols are switched to fast local unix__stream protocols automatically and in a manner transparent to the RPC applications and the client process. Likewise, explicit connection-less (DG) protocols are switched to fast local unix__dgram protocols automatically. In this embodiment, it is no longer necessary to return to the client process an explicit ncacn__unix__stream protocol. The protocol switching is performed "under the covers" of the RPC mechanism and the application, which results in further performance improvement.

In particular, in the original local RPC approach described, the unix__stream protocol is explicitly provided and is visible to the users in the form of foreign-type endpoints appearing in the Endpoint Mapper of DCE daemons. An improved local RPC is achieved when the applications choose to use the connection-oriented or connection-less protocol sequences and the local RPC mechanism implicitly takes priority, or when applications chose to use the unix__stream protocol. This removes Endpoint Mapper related operations for the unix__stream endpoints.

Thus, according to this alternate embodiment of the invention, a transparent switch is carried out from the protocol sequence of the user (as identified in the RPC) to some local protocol, and this switch preferably occurs automatically. This approach removes the explicit unix__stream or unix__dgram protocol and defaults the local RPC optimization for the connection-oriented (CN) and connection-less (DG) protocols. In order to preserve the CN and DG fault semantics, however, separate CN local RPC internal support (ncacn__unix__stream) and DG local RPC internal support (ncacn__unix__dgram) are created.

This alternate process is seen in the flowchart of FIG. 3, which illustrates the major steps in a method for managing communication between a client process and a server process in a distributed computing environment when the client process makes a remote procedure call. In this method, the client process is assumed to reside on a same host computer that is connected to a physical network having a transport layer and a network layer, with the host computer supporting a UNIX-based operating system such as AIX. The method begins at step 30 to determine if the server process is located on the same host computer. If so, the method continues at step 32, returning to the client process a binding handle having a protocol sequence normally associated with the remote procedure call. Thus, the client process "sees" the protocol sequence it expects (given the RPC). At step 34, the method continues by mapping the protocol sequence normally associated with the remote procedure call into an alternate protocol sequence that establishes an interprocess communication path between the client process and the server process. (Steps 32 and 34 may be reversed). Thus, by way of example only, if the protocol sequence associated with the remote procedure call is a connection-oriented protocol "ncacn_ip_tcp", this step maps such sequence into the alternate protocol sequence "ncacn_unix_stream," where "ncacn" is a connection-oriented RPC protocol, "unix" identifies a UNIX Network Address Family (AF_UNIX) communication domain and "stream" identifies a UNIX domain socket. Or, if the protocol sequence associated with the remote procedure call is a connection-less protocol "ncacn_ip_udp", the method step maps the sequence to the alternate protocol sequence "ncadg_unix_dgram," where "ncadg" is a connection-less RPC protocol, "unix" identifies a UNIX Network Address Family (AF_UNIX) communication domain and "dgram" identifies a UNIX domain socket. These protocol sequences, however, are merely representative and should not be taken by way of limitation. At step 36, the routine executes the remote procedure call "locally", for example and again not by way of limitation, by using a send and receive messaging facility of the UNIX-based operating system.

Thus, when the server is started, a unix dgram socket is opened and used to listen on the port allocated for the ncadg_ip_udp protocol. Similarly, a unix stream socket is opened and used to listen on the port allocated for the ncacn_ip_tcp protocol. The socket file name used for the local socket is composed from the port number based on a naming rule. When local clients make RPC's (as described in the method illustrated in FIG. 3), the CN RPC is automatically converted to the ncacn_unix_stream protocol and the DG RPC is converted to the ncacn_unix_dgram and the local socket name obtained from the port number and the naming rule is used to send RPC messages. Because this approach does not involve Endpoint Mapper operations as in the previous embodiment, performance is further improved.

Thus, according to the preferred embodiment, use of the local RPC mechanism is automated when server and client processes are running on the same machine. Preferably, the feature will always be enabled. Thus, when server and client processes are on the same machine, the "ncacn_unix_stream" protocol sequence is used instead of the ncacn_ip_tcp protocol sequence and the "ncadg_unix_dgram" protocol sequence is used instead of the "ncadg_ip_udp" protocol sequence. In the context of the two representative operating systems discussed above, it is preferred that the technique switches "ncacn_ip_tcp" protocol sequence to "ncacn_unix_stream" for both AIX and OS/2 and "ncadg_ip_udp" to "ncadg_unix_dgram" for OS/2 only if this feature is enabled, because implementing the "ncadg_unix_dgram" protocol sequence does not significantly improve performance on AIX. Therefore, if an application uses the "ncadg_ip_udp" protocol sequence on AIX, local RPC may not be recommended even if server and client processes are on the same machine. To disable this feature, an environment variable DISABLE_AUTO_LRPC is set to 1.

Further details of the optimized local RPC mechanism are now described. Familiarity with DCE programming conventions in general and the RPC mechanism in particular are presumed. The first aspect of the design is for the user to identify which protocol sequences will be supported, and this is carried during the RPC initialization routine. If a user sets RPC_SUPPORTED_PROTSEQS to one or more protocol sequences, then only those protocol sequences will be supported. At the end of the RPC initialization routine, however, the DISABLE_AUTO_LRPC variable is checked. If this variable is not set to 1, then a global variable "defaultlrpc" is set to true. RPC Runtime will then support the optimized local RPC feature. This means that the "ncacn_unix_stream" and "ncadg_unix_dgram" protocol sequences will be supported by RPC Runtime. All the modifications in the Runtime code are executed only if defaultlrpc variable is true.

The following describes the modifications related to the application server process that are necessary to support the optimized local RPC feature. It should be appreciated that the following discussion relates to the case of the ncacn_ip_tcp protocol sequence but that the same concepts apply to the ncadg_ip_udp sequence also. One of the features of the local RPC is that the mechanism has to open Unix Domain sockets with endpoints that include all the well known endpoints and the dynamic endpoints for the protocol sequences on which the server process is listening. This is because if a string binding is provided to a client using a well known or a dynamic endpoint, then it cannot be assumed that the DCE daemon DCED is running on the same machine. Thus, there is a need to build a complete destination rpc address using the ncacn_unix_stream protocol sequence and the specified endpoint and then store it in the binding representation. This means that the server process should be listening on Unix Domain sockets that have all the unique well known endpoints and dynamic endpoints bound to them.

To implement the optimized local RPC, the rpc_cn_network_use_protseq( ) in the file src/rpc/runtime/cnnet.c has to be modified. In this routine, whenever a tcp socket is opened, a corresponding unix stream socket is opened. This is the mapping step of FIG. 3. For this unix stream socket, a unix rpc_addr is allocated, with the tcp endpoint converted to a unix stream endpoint according to a naming rule. This unix stream socket is also added to the socket descriptor. Thus, the rpc_cn_network_use_protseq( ) routine is then implemented as follows:

```
if auto LRPC is on
    Get the tcp endpoint
    Allocate memory for the new unix RPC address
    Insert the protseq id, socket address structure length,
    and Network- Address Family into RPC address
    structure
    Open a unix socket and bind the RPC address to it
    Add the socket to the socket descriptor.
end if
```

This completes the description of the modifications related to the application server process.

The following sets forth the modifications related to the application client process. The very first call that a client application makes to RPC runtime is rpc_call_start( ), which in turn calls a protocol specific routine, i.e. rpc_dg_ call_start( ) or rpc_cn_call_start( ) depending on the protocol id in the binding handle. The following modifications are made to rpc_call_start( ) before calling the protocol specific routine.

The routine starts by determining if the destination address in the binding handle is equal to one of the ip addresses for the local host. (This comparison will not work if TCP/IP is not installed on the machine; rather, a different type of comparison is required for addresses related to the RPC protocol sequence for NetBios). If the comparison is true, then appropriate fields in the binding representation are modified so that the ncacn_unix_stream protocol sequence is used instead of the protocol sequence that the application has passed to rpc_call_start( ). The binding representation has the following fields:

```
typedef struct {
    rpc_list_t link;
    rpc_protocol_id_t protocol_id;
    signed8 refcnt;
    uuid_t obj;
    rpc_addr_p_t rpc_addr;
    unsigned is_server: 1;
    unsigned addr_is_dynamic: 1;
    rpc_auth_info_p_t auth_info;
    unsigned32 fork_count;
    unsigned bound_server_instance: 1;
    unsigned addr_has_endpoint: 1;
    unsigned32 timeout;
    signed8 calls_in_progress;
    pointer_t ns_specific;
    rpc_clock_t call_timeout_time; }
    rpc_binding_rep_t, rpc_binding_rep_p_t;
```

According to the routine, the protocol id field in the binding representation is replaced with a connection-oriented RPC protocol id, i.e. O. The binding representation has a destination rpc address stored in it, and rpc_addr is of type rpc_addr_p_t:

```
typedef struct {
    rpc_protseq_id_t rpc_protseq_id;
    unsigned32 len;
    sockaddr_t sa;
} rpc_addr_p_t;
```

The function rpc_cn_call_start( ) the file src/rpc/runtime/cncall.c file has to be modified. The original rpc_addr structure is first saved. At this point, the rpc_addr has a well known endpoint. The routine constructs the destination rpc address for unix stream after converting the endpoint to a unix stream endpoint. Then, the routine replaces the rpc_addr in the binding representation with the new rpc_addr. This rpc_addr with ncacn_unix_stream protocol is not registered with the Endpoint Mapper and thus is not visible to the user. From then on, the RPC will appear to be using unix stream and connection-oriented RPC protocol. After all the transmits and receives are completed, the original rpc_addr structure is copied back to the binding representation and returned to the client process. The function rpc_cn_call_start( ) is set forth below:

```
if auto LRPC is on
    Allocate memory for the new unix RPC address
    Insert the protseq id, socket address structure length,
```

```
and Network_Address Family into RPC address
    structure
    Save the original rpc_addr from the binding
    representation
    Copy the unix rpc_addr to the binding representation
    Do the transmits and receives
    Copy the original rpc_addr back to the binding
    representation
    If any error occurred in the transmit or receive using
    unix stream,
    try again transmitting/receiving using the original
    rpc_addr
    Return to the client
end if
```

In the optimized local RPC mechanism, the bindings with the unix stream are not registered in the Endpoint Mapper or exported to the namespace. When a client process enquires the bindings using the import_begin and import_next call functions, it will not get bindings with ncacn_unix_stream. The API call rpc_server_inq_bindings returns the bindings of a server to which RPCs may be made. The function uses the sockets from the listener sockets to get the bindings. Since the server is listening in the stream sockets, the following filter is provided:

```
for loop for enquiring the bindings from the listener sockets
    if the socket protseq is unix stream,
        skip the binding
end for loop
```

As noted above, according to the invention the application client talks to the application server using the unix stream protocol and this protocol is thus exposed to the application server. To hide this, the rpc_binding_from_string_binding routine is changed. Here, the rpc_addr is filled with the local machine's address and ncacn_ip_tcp protocol sequence, instead of from the binding handle. By doing this, the client process "sees" the protocol sequence it expects and an alternate protocol sequence is used to effect the communication path. The result is that the ncacn_unix_stream is hidden from the user. The function is shown below:

```
if the binding rep rpc_addr has unix stream in it
    enquire the local machine address with tcp protocol
    sequence
    Insert the tcp protseq id, socket address structure
    length, and IP- Network Address family into RPC
    address structure
    Copy this rpc_addr to the binding representation
    return this rpc_addr back
end if
```

The above described design sets forth the modifications necessary to implement the optimized local RPC mechanism. An important goal of this enhancement is to ensure that its implementation is virtually invisible to the user and is backwards compatible with existing client/server applications.

This following detailed specification explains how to add RPC support for the ncacn_unix_stream protocol sequence.

0.1.1 External Interface Descriptions

The external interface of RPC runtime and RPCD is changed as follows:

The user has the new ability to specify an additional protocol sequence in addition to those already supported. The new protocol sequence is named "ncacn_unix stream". Anywhere that an API function parameter, environmental variable, or command line argument allows for the specification of the string format for a protocol sequence, the string "ncacn_unix_stream" will be allowed.

0.1.2 Internal Design Description

The RPC enhancement adds support for a new protocol sequence (ncacn_unix stream), that is used when a client and server exist on the same host machine.

This RPC enhancement is virtually invisible to the user, and is backwards compatible with existing client/server applications.

The invention is portable to other platforms, such as the IBM OS/2 platform. OS/2 has support for the UNIX Domain (via MPTS). The Common Porting Platform (CPP) DLL's on OS/2 will allow almost all of the UNIX specific subroutine calls to be used without modification on OS/2.

The design of the RPC runtime library is such that the addition of a new protocol sequence is accomplished with very little modification to the existing code. This is achieved via two means: 1) Modular data structures, and 2) The use of entry point vectors. Modular data structures facilitate the effort of adding the new protocol sequence by providing a consistent mechanism by which to relate the various components that make up the protocol sequence. The majority of the RPC runtime code is common to all protocols, so the use of entry point vectors allows protocol specific routines to be accessed in-line, via an index into an array of functions. The protocol id is used as the index into the entry point vector. New protocol sequences require the addition of new routines to handle processing that is specific to that protocol sequence.

The ncacn_unix_stream protocol sequence is built using the AF_UNIX address family and a socket type of SOCK_STREAM. The socket address uses the structure sockaddr_un, using a complete path name specification as the interprocess communication mechanism. The client and server must reside on the same host to use this protocol sequence. The protocol sequence is connection-oriented, and uses the CN protocol id.

The rest of this section of the document discusses the RPC source files that require modification in order to implement the new protocol sequence. An attempt has been made to list the files, starting with wide implication changes, and narrowing down to more specific changes.

0.1.2.1 src/rpc/runtime/com.h

This is an existing file. The addition of the following constant identifiers are necessary. These constants are used throughout the RPC runtime code to access appropriate structures and properly index entry point vectors.

RPC protocol sequence id constant:

define rpc_c_protseq_id_ncacn_unix_stream 5

RPC protocol sequence string constant:

define rpc_protseq_ncacn_unix_stream "ncacn_unix_stream"

RPC Network Address Family constant:

```
#define rpc_c_naf_id_unix 1
```

0.1.2.2 src/rpc/runtime/comp.c

This is an existing file. The following table element additions are necessary. These table elements add support for the Unix Domain Address Family, as well as the ncacn_unix_stream protocol sequence.

The global array rpc_g_protseq_id[] was expanded as follows:

```
GLOBAL rpc_protseq_id_elt_t rpc_g_protseq_id[rpc_protseq_id_max] =
{
        .../*existing table elements*/

{
                0,
                rpc_c_protseq_id_ncacn_unix_stream,
                rpc_c_protocol_id_ncacn,
                rpc_c_naf_id_unix,
                rpc_c_network_protocol_id_uns /*Unspecified*/
                rpc_protseq_ncacn_unix_stream

}
{;
```

The global array rpc_g_naf_id[] must be expanded as follows:

```
GLOBAL rpc_naf_id_elt_t rpc_g_naf_id[rpc_naf_id_max] =
{
        ... *existing table elements */

{
                rpc_unix_init,
                rpc_c_naf_id_unix,
                rpc_c_network_if_id_stream,
                NULL

}

.../*existing table elements*/
};
```

0.1.2.3 src/rpc/runtime/unixnaf.c

This is a new file that needs to be created. It provides support for the necessary entry point vector routines for the Unix Domain Network Address Family. There is an RPC structure called rpc_naf_epv_t that is defined as follows:

```
typedef struct
{
        rpc_naf_addr_alloc_fn_t naf_addr_alloc;
```

```
            rpc_naf_addr_copy_fn_t naf_addr_copy;
            rpc_naf_addr_free_fn_t naf_addr_free;
            rpc_naf_addr_set_endpoint_fn_t naf_addr_set_endpoint;
            rpc_naf_addr_inq_endpoint_fn_t naf_addr_inq_endpoint;
            rpc_naf_addr_set_netaddr_fn_t naf_addr_set_netaddr;
            rpc_naf_addr_inq_netaddr_fn_t naf_addr_inq_netaddr;
            rpc_naf_addr_set_options_fn_t naf_addr_set_options;
            rpc_naf_addr_inq_options_fn_t naf_addr_inq_options;
            rpc_naf_desc_inq_addr_fn_t naf_desc_inq_addr;
            rpc_naf_desc_inq_network_fn_t naf_desc_inq_network;
            rpc_naf_inq_max-tsdu_fn_t naf_inq_max_tsdu;
            rpc_naf_get_broadcast_fn_t naf_get_broadcast;
            rpc_naf_addr_compare_fn_t naf_addr_compare;
            rpc_naf_inq_pth_unfrg_tpdu_fn_t naf_inq_max_pth_unfrg_tpdu;
            rpc_naf_inq_loc_unfrg_tpdu_fn_t naf_inq_max_loc_unfrg_tpdu;
            rpc_naf_set_pkt_nodelay_fn_t naf_set_pkt_nodelay;
            rpc_naf_is_connect_closed_fn_t naf_is_connect_closed;
            rpc_naf_twr_flrs_from_addr_fn_t naf_tower_flrs_from_addr;
            rpc_naf_twr_flrs_to_addr_fn_t naf_tower_flrs_to_addr;
            rpc_naf_desc_inq_peer_addr_fn_t naf_desc_inq_peer_addr;
}rpc_naf_epv_t, *rpc_naf_epv_p_t;
```

Each NAF has an initialization routine that loads up this structure, and adds it to the rpc_g_naf_id[] table entry for the specified NAF. From that point on, all calls to the Unix Network Address Family are made through these EPVs.

The following routines must be created to implement the Unix Network Address Family.

0.1.2.3.1 rpc_unix_init()

```
PRIVATE void rpc_unix_init(naf_epv,status)
rpc_naf_epv_p_t*naf_epv;
unsigned32*status:
{
        Load the rpc_unix_epv structure with the static routines defined in this file
(unixnaf.c).
        Return the NAF epv, so it can be added to the global NAF table.

}
```

0.1.2.3.2 addr-alloc()

```
INTERNAL void-addr-alloc(rpc_protseq_id_naf_id, endpoint,netaddr,network
options,rpc_addr,status)
rpc_addr_p_t src_rpc_addr;
rpc_addr_p_t*dst_rpc_addr;
unsigned32*status;

{
```

Allocate memory for the destination RPC address
Copy source rpc address to destination rpc address
}

0.1.2.3.3 addr_copy()

INTERNAL void addr_copy (src_rpc_addr. dist_rpc_addr. status)
rpc_addr_p_t_ src_rpc_addr;
rpc_addr_p_t *dist_rpc_adr;
unsigned32 *staus;
{

Allocate memory for the destination ROC address
Copy source rpc address to destination rpc address
}

0.1.2.3.4 addr_free()

INTERNAL void addr_free (rpc_addr,status)
rpc_addr_p_t *rpc_addr;
unsigned 32 *status;
{
Free memory of RPC addr and set the RPC address pointer to NULL.
}

0.1.2.3.5 addr_set_endpoint()

INTERNAL void addr_set_endpoint (endpoint, rpc_addr,status)
unsigned_char_p_t endpoint;
rpc_addr_p_t *rpc_addr;
unsigned32 *status;
{
Check for the special case where endpoint is a pointer to a zero length string (as opposed to NULL). In this case, the caller is requesting that the endpoint be zeroed out of the rpc_addr structure, so just set rpc addr->sa.sun_path[0] = '\0' and return.

BEGIN AIX ONLY
Check for the existence of the RPC_UNIX_DOMAIN_DIR_PATH environment variable.
if it exists then use it as the base for file name paths.
if it doesn't exist, then use the default: /var/dce/rpc/socket on AIX.

if an endpoint was specified, then check if it is a full path (i.e. starts with '/' character) or just a relative filename.

if it is a relative path, then append it to the base path.
if it is an absolute path, then overwrite what has been given as the path up to this point, no matter what it is.
END AIX ONLY if no endpoint was given, create one using uuid_create() and uuid_to string().
Now have a 32 character uuid string as the filename.

append the filename to the path.

Now that a full path has been built, add the pathname to the RPC addr structure (sa.sun_path) and set the length of the filename.

}

0.1.2.3.6 addr_inq_endpoint()

```
INTERNAL void addr-inq-endpoint (rpc_addr, endpoint,status)
rpc_addr_p_t_ rpc_addr;
unsigned_char_t**endpoint;
unsigned32*status:
{
    Allocate memory for the filename (ie the endpoint).
    strcpy() the filename from the RPC addr structure into the newly allocated
string.

}
```

0.1.2.3.7 addr-set-netaddr()

```
INTERNAL void addr_set_netaddr(netaddr,rpc_addr,status)
unsigned_char_p_t netaddr;
rpc_addr_p_t*rpc_addr;
unsigned32*status;

{
    This is a no-op routine. There is no netaddr concept when using the Unix
Domain.
    The routine must exist though, for consistency with other NAFs (network
address family) that do require it.

}
```

0.1.2.3.8 addr_inq_netaddr()

```
INTERNAL void addr_inq_netaddr(rpc_addr,netaddr,status)
rpc_addr_p_t rpc_addr;
unsigned_char_5**netaddr;
unsigned32*status;
{
    This is a no-op routine. There is no netaddr concept when using the Unix
Domain.
    The routine must exist though, for consistency with other NAFs that do
require it.
```

}

0.1.2.3.9 addr_set_options()

```
INTERNAL void addr_set_options(network_options,rpc_addr,status)
unsigned_char_p_t network_options;
rpc_addr_p_t *rpc_addr;
unsigned32 *status;
{
        This is a no-op routine. There is no network options concept when using
    the Unix Domain.
        The routine must exist though, for consistency with other NAFs that do
    require it.
}
```

0.1.2.3.10 addr_inq_options()

```
INTERNAL void addr_inq_options (rpc_addr, network_options, status)
rpc_addr_p_t rpc_addr;
unsigned_char_t **network_options;
unsigned 32 *status;
{
        This is a no-op routine. There is no network options concept when using
    the Unix Domain.
        The routine must exist though, for consistency with other NAFs that do
    require it.
}
```

0.1.2.3.11 inq_max_tsdu()

```
INTERNAL void inq_max_tsdu (naf_id, iftype, protocol, max_tsdu, status)
rpc_naf_id_t naf_id;
rpc_network_if_id_t iftype;
rpc_network_protocol_id_t protocol;
unsigned 32 *max_tsdu;
unsigned 32 *status;
{
        This is a no-op routine. The packets will not be going out on the network,
    so IP settings are not relevant.
}
```

0.1.2.3.12 addr_compare()

```
INTERNAL boolean addr_compare (addr1, addr2, status)
rpc_addr_p_t addr1, addr2;
unsigned 32 *status;
{
        Compare the socket address file name paths of the 2 RPC addrs passed in.
        Return TRUE or FALSE.
}
```

0.1.2.3.13 inq_max_pth_unfrag_tpdu()

```
INTERNAL void inq_max_pth_unfrag_tpdu
(rpc_addr, iftype, protocol, max_tpdu, status)
rpc_addr_p_t rpc_addr;
rpc_network_if_id_t iftype;
rpc_network_protocol_id_t protocol;
unsigned32 *max_tpdu;
unsigned 32 *status;
```
        This is a no-op routine. The packets will not be going out on the network, so IP settings are not relevant.
}

0.1.2.3.14 inq_max_loc_unfrag_tpdu()

```
INTERNAL void inq_max_loc_unfrag_tpdu
(naf_id,iftype,protocol,max_tpdu,status)
rpc_naf_id_t naf_id;
rpc_network_if_id_t iftype;
rpc_network_protocol_id_t protocol;
unsigned32*mas_tpdu;
unsigned32*status:
{
```
        This is a no-op routine. The packets will not be going out on the network, so IP settings are not relevant.
}

0.1.2.3.15 desc_inq_network()

```
INTERNAL void desc_inq_network(desc,socket_type, protocol_id,status)
rpc_socket_t desc;
rpc_network_if_id_t *socket_type;
rpc_network_protocol_id_t *protocol_id;
unsigned32*status;
{
```
        Call RPC_socket_get_if_id() to get the socket_type.

Based on the socket type, return the protocol id. In our case it will always be rpc_c_network_protocol_id_uns (Unspecified).

}

0.1.2.3.16 set_pkt_nodelay()

```
INTERNAL void set_pkt_nodelay(desc,status)
rpc_socket_t desc;
unsigned32*status;
{
```
        This is a no-op routine. The packets will not be going out on the network, so IP settings are not relevant.
}

0.1.2.3.17 is_connect_closed()

```
INTERNAL boolean is_connect_closed (desc,status)
rpc_socket_t desc;
unsigned 32 *status;
{
        This routine always returns true.
}
```

0.1.2.3.18 tower_flrs_from_addr()

```
INTERNAL void tower_flrs_from_addr (rpc_addr, lower_flrs, status)
rpc_addr_p_t rpc_addr;
twr_p_t *lower_flrs;
unsigned 32 *status;
{
```
> Get the network protocol id (aka transport layer protocol) for this RPC addr.
>
> Use the network protocol id as a parameter to the routine twr_unix_lower flrs_from_sa().
> This routine will return a tower octet string representing the lower floors of a tower reference for the Unix Domain RPC address. See the file twr unix.c (Later in this document) for details of the twr_unix_lower_flrs_from sa() routine.

}

0.1.2.3.19 tower_flrs_to_addr()

```
INTERNAL void tower_flrs_to_addr (tower_octet_string,
rpc_addr, status)
byte_p_t tower_octet_string;
rpc_addr_p_T *rpc_addr;
unsigned 32 *status;
{
```
> Convert the lower floors of a tower to a sockaddr, calling the routine twr unix_lower_flrs_to_sa(). See the file twr_unix.c (Later in this document) for details of the twr_unix_lower_flrs_to_sa() routine.
>
> Add the socket address to an RPC address and return it.

}

0.1.2.3.20 desc_inq_peer_addr()

```
INTERNAL void desc_inq_peer_addr (protseq_id, desc, rpc_addr, status)
rpc_protseq_id_t_ protseq_id;
rpc_socket_t desc;
rpc_addr_p_t *rpc_addr;
unsigned32 *status;
{
```

Allocate memory for the new RPC address, and fill in the protseq id and length of the sockaddr structure.

Call rpc_socket_inq_endpoint(), which will fill in the peer endpoint, which is always the same as the current processes endpoint, in the case of Unix Domain.
}

0.1.2.4 src/rpc/runtime/unixnaf.h

This is a new file that must be created. This file primarily contains prototypes for the Unix NAF epv routines. In addition, it contains a definition for the representation of a Unix Domain RPC address. It is defined as follows:

```
typedef struct rpc_addr_unix_t
{
    rpc_protseq_id_t rpc_protseq_id;
    unsigned32 len;
    struct sockaddr_un sa;
} rpc_unix_addr_t, *rpc_unix_addr_p_t;
```

When RPC is executing command code, the RPC address is passed around as a quasi-opaque structure (rpc_addr_t), but this structure is cast to the RPC address structure for the appropriate family when it is passed to a NAF specific routine; in the case of unix stream, it is cast to rpc_unix_addr_t.

Another necessary addition to this file is the default pathname to be used for creating filenames for use with Unix Domain socket calls on AIX. This is Operating System specific, and is not necessary on OS/2. When creating an endpoint, if the endpoint does not exist, or the endpoint to be used does ot specify a full pathname, then the default pathname is used. The default pathname will be defined as follows:

```
#ifdefined(AIX_PROD)
#define RPC_DEFAULT_UNIX_DOMAIN_PATH "_"/var/dce/rpc/socket"
#endif
```

On the OS/2 operating system, Unix Domain socket files are only used internally. No user viewable file gets created. The OS/2 operating system handles the administrative tasks associated with the socket file (ie cleanup). No special path generation is necessary.

0.1.2.5 src/rpc/runtime/RIOS/unixnaf_sys.c

This is a new file that must be created. It dontains routines that are system specific to the RIOS platform, as pertains to the Unix Domain Network Address Family.

This is a new file that is created. It contains routines that are system specific to the RIOS platform, as pertains to the Unix Domain Network Address Family.

0.1.2.5.1 rpc_unix_desc_inq_addr()

Receive a socket descriptor which is queried to obtain family, endpoint and network address. If this information appears valid for a Unix Domain address, space is allocated for an RPC address which is initialized with the information obtained from the socket. The address indicating the created RPC address is returned in rpc_addr.

```
PRIVATE void rpc_unix_desc_inq_addr (protseq_id, desc, rpc_addr_vec, status)

rpc_protseq_id_t protseq_id;
rpc_socket_t desc;
rpc_addr_vector_p_t *rpc_addr_vec;
unsigned 32 *status;

{
        Simply do a "getsockname" into a local Unix Domain RPC address.
        Allocate memory for the RPC address, and RPC address vector.
        Fill in the RPC address structure with the protocol sequence id, and the
        Unix sockaddr structure.
        Add the RPC address to the RPC address vector.
}
```

0.1.2.5.2 rpc_unix_get_broadcast()

This routine is a no-op, but is necessary, so that there will be an entry in the NAF epv.

```
PRIVATE void rpc_unix_get_broadcast (naf_id, protseq_id_, rpc_addr_vec, status)
rpc_naf_id_t naf_id;
rpc_protseq_id_t protseq_id;
 rpc_addr_vector_p_t *rpc_addr_vec;
unsigned32 *status;
{
        Do nothing.  Set output parameters to NULL and return.
}
```

0.1.2.6 src/rpc/runtime/twr_unix.h

This is a new file, and must be created. This file contains declarations and prototypes specific to the twr_unix.c file. Currently, this file only contains a prototype for the routing rpc_rpcd_is_running().

0.1.2.7 src/rpc/runtime/twr_unix.c

This is a new file that must be created. This file contains routines specific to doing converstions from tower representations to socket addresses, and vice versa. It also contains a utility routine, used by both the RPC runtime and RPCD.

0.1.2.7.3 rpc_rpcd_is_running()

This is a new routine. It is used for two purposes: 1) the RPCD will use it during initialization to determine if an instance of RPCD is already running, and 2) the RPC runtime will use it to determine if the RPCD on the local host is running, and if it supports the ncacn_unix_stream protocol sequence.

This routine checks for an instance of RPCD that supports ncacn_unix_stream. This is done by looking for the existence of the rpcd endpoint file (/var/dce/rpc/socket/135). If the file does not exist, then no RPCD is running with support for Unix Streams. If the file does exist, it uses it to attempt to connect to the RPCD instance. If the connect fails, then no RPCD is running with support for Unix Streams. Remove the file. If the connect is successful, then RPCD is running. Do not remove the file.

```
PRIVATE boolean32 rpc_rpcd_is_running(status)
unsigned32 *status;
{
        Check if the Unix Streams protocol sequence is supported. If not, return
        the error rpc_s_protseq_not_supported.

Inspect the interface specification for the RPCD (ept_v3_0_cifspec) and get
        the well-known endpoint for the Unix Streams protocol sequence.

The endpoint is used as a socket file for communicating to the RPCD.
        First, check if the file exists. If it does exist, then we expect it to be a file
        associated with a socket, and the fopen() should fail with the appropriate
        error. If it doesn't exist, then there is no rpcd running (at least with
        support for ncacn_unix_stream). So just return. Everything is ok.

If this file can be opened, then it is NOT a socket file. Therefore remove i
        t (i.e. it shouldn't be therein the first place) and return.

If the file exists, and is a socket file, check if there is an RPCD actively
        using it. Do this via a socket()/connect() sequence.

If no rpcd is running, we expect the connect call to fail. We check for the
        proper error, and flag the case where an unexpected error occurs.

If able to connect to the RPCD, return true. Otherwise, return false.
}
```

0.1.2.8 src/rpc/runtime/twrp.h

This is an existing file. This file contains declarations that are related to the construction and examination of RPC tower reference structures and octet strings. This file will be modified to include the following additional lines:

```
/* Protocol identifiers for each lower tower floor. */
#define twr_c_flr_prot_id_fname 0x20 /* Unix Domain filename */
#define twr_c_flr_prot_id_dummy 0x21 /* Dummy prot id for floor 5 */
```

```
/* Number of lower floors in Unix address family. */
#define twr_c_num_unix_lower_flrs 2 /* Number lower flrs in unix tower */

/* Unix family filename size */
#define twr_c_unix_frame_size 108
```

NOTE: The Unix Domain tower reference only makes use of 4 tower floors, but a fifth floor is included, and contains no data. This is because the algorithm the RPC runtime uses to examine a tower octet string requires 5 floors in order for it to be considered a "full tower." The Unix domain is a full tower, but only 4 floors have data associated with them.

0.1.2.9 src/rpc/runtime/comtwrref.c

This is an existing file. This file contains routines that operate on the runtime reference representation of protocol towers.

0.1.2.9.1 rpc_tower_ref_inq_protseq_id()

This routine is modified. This routine contains a static table that contains mappings of all available protocol sequences to the combination of protocol ids for upper floor 3 and the lower tower floors that make up the tower reference for that protocol sequence. This table must be modified, to include the addition of an entry for the ncacn_unix_stream protocol sequence:

```
static rpc_tower_prot_ids_t rpc_tower_prot_ids[rpc_c_protseq_id_max+1] =
{
        {rpc_c_protseq_id_ncacn_unix_stream,3,
                {{rpc_c_cn_proto_id, {0}},
                        {twr_c_flr_prot_id_fname,{0}},
                        {twr_c_flr_prot_id_dummy,{0}},
                        {0x00, {0}}
                }
        },
        .../*other existing table elements*/
};
```

0.1.2.15 src/rpc/rpcd/rpcd.c

This is an existing file. This file needs to be modified so that when the rpcd server comes up, it checks if the socket file that is used to listen for requests over ncacn unix_stream exists. If it does, then it needs to delete it. This is because a socket file cannot be created if the file already exists.

0.1.2.15.1 main ()

The following code must be added after the database has been initialized, but before the protocol sequence support is set up:

```
..../* database initialization */
....
```

```
if (rpc_rpcd_is_running(&status))
{
        fprintf(stderr,
        "(rpcd) Instance already running. Can't continue.\n");
        exit(1);
} if ((status != rpc_s_ok) && (status != rpc_s_protseq_not_supported))
{
        fprintf(stderr,
        "(rpcd) Error checking for other rpcd instances.\n");
        exit(1);
}
....
..../*rest of rpcd setup */
```

0.1.2.16 src/libdce/RIOS/libdce.syms

This is an existing file. This file needs to be updated to include the routine rpc rpcd_is_running(). This is so that routines or programs outside of libdce.a can access the routine. Since rpcd calls this routine, it needs to be here. All that is necessary is to add the following line to libdce.-syms:

rpc_rpcd_is_running

0.1.2.17 Auto Handles

The use of the [auto_handle] attribute indicates that application code will not be responsible for obtaining a binding handle, and/or resolving an endpoint for that binding handle. The [auto_handle] attribute specifies that the RPC runtime will handle all of this. All the user specifies is the namespace entry where the RPC runtime should start looking for a binding handle (This is done via the environment variable RPC_DEFAULT_ENTRY). The RPC runtime has the intelligence to use ncacn_unix_stream in the case where a client and server are on the same host.

0.1.2.18 Utilities

The implementation of this feature requires the creation of some utilities to perform administrative duties. These are outlined below.

0.1.2.18.1 src/rpc/utils/rpcclean

This utility will simply call the RPC runtime routing rpc_network_inq_protseqs(), and print out the resulting protocol sequence string vector, one protocol sequence to a line. This utility will be used to mkdce to determine the protocol sequences that are available on a given host. Currently the supported protocol sequences are hard-wired into the mkdce script. The script can also be used a a quick way for an administrator to determine the supported protocol sequences on a given host. The code for this utility is given below:

```
*include <stdio.h>
*include <dce/rpc.h>
*include <dce/ecd_error.h> char message[dce_c_error_string_len];

main(unsigned32argc,unsigned_char_p_t argv[])
{
        rpc_protseq_vector_p_t psvp;
        unsigned32i,status=0, tmp_status=);

rpc_network_inq_protseqs( &psvp, &status);
        if (status !=rpc_s_ok)

{
                dce_error_inq_text(status, message,&tmp_status);
                printf("%s: %s/n", argv[0], message);
                exist(1);
        } for (i = 0; i<psvp->count; i++)
        {
                printf("%s/n", psvp->protseq[i]);
        }
}
```

0.1.2.18.2 src/rpc/utils/rpcprotseqs

This utility will simply call the RPC runtime routine rpc_network_inq_protseqs(), and print out the resulting protocol sequence string vector, one protocol sequence to a line. This utility will be used by mkdce to determine the protocol sequences that are available on a given host. Currently, the supported protocol sequences are hard-wired into the mkdce script. The script can also be used as a quick way for an administrator to determine the supported protocol sequences on a given host. The code for this utility is given below:

```
include <stdio.h> include <dce/rpc.h> include <dce/dce_error.h> char message[dce_c_error_string_len];

main(unsigned32 argc, unsigned_char_p_t argv[])

{
        rpc_protseq_bector_p_t psvp;

unsigned32 i, status=0, tmp_status=0;
```

```
        rpc_network_ing_protseqs(&psvp, &status);

if (status != rpc_s_ok)

{ dce_error_ing_text(status, message, &tmp_status);

printf("%s: %s/n", argv[0], message);

exit(1);

} for (i = 0; i < psvp->count; i++)

{ printf("%s/n",psvp->protseq[i]);

}
}
```

0.1.3 Compatibility

This Feature should not cause any compatibility problems.

0.1.3.1 Backwards Compatibility

Existing applications will be able to upgrade DCE to include this feature, and run without modification. Client/Server applications on different hosts, where one is enhanced to use this feature, and the other is not, will be able to run without modification also. This is more an issue of coexistence, rather than compatibility, since the Unix Domain can not be used across machines.

0.1.3.2 Cross-Platform Compatibility

This feature will be implemented for use on AIX as well as OS/2. Although Client/Server applications that communicate between AIX and OS/2 platforms will not be able to take advantage of this feature, the existing applications will be able to upgrade DCE to include this feature, and run without modification.

Backwards compatibility only extends across platforms, to the extent that it was possible before the introduction of this feature. All compatibility claims are, of course, notwithstanding the introduction of other incompatibilities from sources beyond the scope of this feature.

0.1.4 Installation and Configuration Impacts

When DCE is installed on a machine, the directory /var/dce/rpc/socket must be created. If the directory already exists, then the directory should be wiped out and recreated. This is where the Unix Domain socket files will be created, and any files left hanging around this directory are stale, since it is assumed that all DCE applications are halted when a DCE installation upgrade takes place.

0.1.5 RAS Impacts

There are no RAS impacts from this feature.

0.1.6 NLS Impacts

There are no NLS impacts from this feature.

0.1.7 Performance and Storage Estimates

Performance of RPC calls will improve by 10-20% in the case where the client and server reside on the same host. Performance when the client and server exist on different hosts will not be affected in any way.

Storage estimates are not an issue. A socket file will be created for each Unix Domain endpoint that a server registers, but this file is zero length.

The rpcclean utility (discussed previously in this document) can be run to remove stale socket files left lying around on the system. This will reduce the number of used inodes on the filesystem.

0.1.8 Test Plan

The testplan will be a separate document. It will most likely be an addendum to the existing RPC FVT Testplan, indicating any additional testcases, or configurations that are necessary to ensure that this feature works correctly.

One of the preferred implementations of the present invention is as a set of instructions in a code module resident in the random access memory of the personal computer or workstation. Until required by the computer system, the set of instructions may be stored in another computer memory, for example, in a hard disk drive, or in a removable memory such as an optical disk (for eventual use in a CD ROM) or floppy disk (for eventual use in a floppy disk drive).

While the invention has been described in terms of a preferred embodiment in a specific operating system and network environment, those skilled in the art will recognize that the invention can be practiced, with modification, in other and different operating systems and network architectures with the spirit and scope of the appended claims. Thus, for example, in the nomenclature of the DCE RPC architecture, a client process passes a "binding handle" to the server process. The present invention, however, is not to be construed as limited to the DCE RPC architecture and thus in a more general sense the invention should be broadly construed to cover any network environment where the client process obtains and establishes a local communication, e.g., by passing to the server process a data structure that specifies the location of the server process and establishes the communication protocol to be used between the client and server processes.

Having thus described our invention, what we claim as new and desire to secure by Letters Patent is set forth in the following claims:

1. A method for managing communication between a client process and a server process in a distributed computing environment, the client process residing on a host computer that is connected to a physical network having a transport layer and a network layer, comprising the steps of:
   (a) in response to a remote procedure call (RPC) made by the client process, detecting whether a server process identified by the RPC is located on the host computer, the RPC having a protocol sequence associated therewith defining a communication path through use of the transport and network layers;
   (b) if the server process is located on the host computer, establishing an interprocess communication path between the client process and the server process;
   (c) returning the RPC protocol sequence to the client process so that the client process obtains a protocol sequence it expects when making an RPC; and
   (d) executing the remote procedure call over the interprocess communication path instead of using the RPC protocol sequence.

2. The method as described in claim 1 wherein the protocol sequence associated with the RPC is a connection-oriented protocol sequence.

3. The method as described in claim 1 wherein the protocol sequence is a connection-less protocol sequence.

4. The method as described in claim 1 wherein the remote procedure call is executed using a send and receive messaging facility of an operating system of the host computer.

5. A method for managing communication between a client process and a server process in a distributed computing environment, the client process residing on a host computer that is connected to a physical network having a transport layer and a network layer, comprising the steps of:
   (a) when a remote procedure call is made by the client process, detecting whether a server process identified by the remote procedure call is located on the host computer;
   (b) if the server process is located on the host computer, returning to the client process a first data structure including a protocol sequence defining a communication path through use of the transport and network layers so that the client process obtains a protocol sequence it expects when making the remote procedure call;
   (c) mapping the first data structure to a second data structure, the second data structure including a protocol sequence defining an interprocess communication path between the client process and the server process; and
   (d) executing the remote procedure call over the interprocess communication path defined by the protocol sequence in the second data structure instead of using the protocol sequence in the first data structure.

6. The method as described in claim 5 wherein the remote procedure call is executed using a send and receive messaging facility of an operating system of the host computer.

7. A method for managing communication between a client process and a server process in a distributed computing environment, the client process residing on a host computer that is connected to a physical network having a transport layer and a network layer, comprising the steps of:
   (a) when a remote procedure call is made by the client process, detecting whether a server process identified by the remote procedure call is located on the host computer;
   (b) if the server process is located on the host computer, returning to the client process a first data structure including a connection-oriented protocol sequence defining a communication path through use of the transport and network layers;
   (c) mapping the first data structure to a second data structure, the second data structure including a protocol sequence defining an interprocess communication path between the client process and the server process; and
   (d) executing the remote procedure call over the interprocess communication path defined by the protocol sequence in the second data structure;
   wherein the protocol sequence of the second data structure includes a full pathname to a socket file.

8. The method as described in claim 7 wherein a naming rule and an endpoint are used to determine the pathname.

9. A method for managing communication between a client process and a server process in a distributed computing environment when the client process makes a remote procedure call, the client process residing on a host computer that is connected to a physical network having a transport layer and a network layer, the host computer supporting a UNIX-based operating system, comprising the steps of:
   (a) if the server process is located on the host computer, returning to the client process a binding handle having a protocol sequence normally associated with the remote procedure call;
   (b) mapping the protocol sequence normally associated with the remote procedure call into an alternate protocol sequence that establishes an interprocess communication path between the client process and the server process; and
   (c) executing the remote procedure call over the interprocess communication path using a send and receive messaging facility of the UNIX-based operating system;
   wherein the protocol sequence associated with the remote procedure call is a connection-oriented protocol "ncacn_ip_tcp" and the alternate protocol sequence is "ncacn_unix_stream," where "ncacn" is a connection-oriented RPC protocol, "unix" identifies a UNIX Network Address Family (AF_UNIX) communication domain and "stream" identifies a UNIX domain socket.

10. A method for managing communication between a client process and a server process in a distributed computing environment when the client process makes a remote procedure call, the client process residing on a host computer that is connected to a physical network having a transport layer and a network layer, the host computer supporting a UNIX-based operating system comprising the steps of:

(a) if the server process is located on the host computer, returning to the client process a binding handle having a protocol sequence normally associated with the remote procedure call;

(b) mapping the protocol sequence normally associated with the remote procedure call into an alternate protocol sequence that establishes an interprocess communication path between the client process and the server process; and (c) executing the remote procedure call over the interprocess communication path using a send and receive messaging facility of the UNIX-based operating system;

wherein the protocol sequence associated with the remote procedure call is a connection-less protocol "ncacn_ip_udp" and the alternate protocol sequence is "ncadg_unix_dgram," where "ncadg" is a connection-less RPC protocol, "unix" identifies a UNIX Network Address Family (AF_UNIX) communication domain and "dgram" identifies a UNIX domain socket.

11. In a local area network providing a distributed computing environment in which users can access distributed resources and process applications, the local area network including a host computer having an interprocess communication (IPC) mechanism, the improvement comprising:

means responsive to an remote procedure call (RPC) from a client process for detecting whether a server process identified by the RPC is located on the host computer; and means responsive to the detecting means for returning to the client process an expected protocol sequence and for using an alternate protocol sequence instead of the expected protocol sequence to facilitate the RPC, the alternate protocol sequence establishing a communication path through the IPC mechanism.

12. A computer system providing a distributed computing environment in which users can access distributed resources and process applications, the computer system including a host computer connected to a local area network having a transport layer and a network layer, comprising:

means responsive to an remote procedure call (RPC) from a client process for detecting whether a server process identified by the RPC is located on the host computer; and means responsive to the detecting means for returning to the client process an expected protocol sequence and for using an alternate protocol sequence instead of the expected protocol sequence to facilitate the RPC, wherein the use of the alternate protocol sequence is transparent to the client process.

13. A program storage device readable by a host processor and tangibly embodying a program of instructions executable by the host processor to perform a method for managing communications from a client process running on the host processor, the host processor connected to a local area network having a transport layer and a network layer, the method comprising the steps of:

(a) when a remote procedure call is made by the client process, detecting whether a server process identified by the remote procedure call is located on the host computer;

(b) if the server process is located on the host computer, returning to the client process a first data structure including a protocol sequence defining a communication path through use of the transport and network layers so that the client process obtains a protocol sequence it expects when making the remote procedure call;

(c) mapping the first data structure to a second data structure, the second data structure including a protocol sequence defining an interprocess communication path between the client process and the server process; and (d) executing the remote procedure call over the interprocess communication path defined by the protocol sequence in the second data structure instead of using the protocol sequence in the first data structure.

* * * * *